(12) United States Patent
French

(10) Patent No.: US 7,267,030 B2
(45) Date of Patent: Sep. 11, 2007

(54) BICYCLE CRANK ASSEMBLY

(75) Inventor: George French, Sheffield (GB)

(73) Assignee: Bear Corporation, Cerritos, CA (US)

( * ) Notice: Subject to any disclaimer, the term of this patent is extended or adjusted under 35 U.S.C. 154(b) by 0 days.

(21) Appl. No.: 11/183,541

(22) Filed: Jul. 19, 2005

(65) Prior Publication Data

US 2007/0017318 A1    Jan. 25, 2007

(51) Int. Cl.
*G05G 1/14* (2006.01)
(52) U.S. Cl. .................... 74/594.1; 74/594.2; 280/210
(58) Field of Classification Search ............... 74/594.1, 74/594.2, 143; 280/210; 73/862.338; 403/24
See application file for complete search history.

(56) References Cited

U.S. PATENT DOCUMENTS

| | | | |
|---|---|---|---|
| 622,644 A | | 4/1899 | Annable |
| 630,176 A | * | 8/1899 | Brown ........................ 403/370 |
| 648,077 A | * | 4/1900 | Ludlow ........................ 403/24 |
| 921,100 A | | 5/1909 | Girard |
| 2,244,734 A | | 6/1941 | Severance |
| 3,361,459 A | | 1/1968 | Marquis et al. |
| 3,906,811 A | | 9/1975 | Thun |
| 4,171,822 A | | 10/1979 | Thun |
| 4,191,488 A | * | 3/1980 | Bickerton ................... 403/370 |
| 4,358,967 A | * | 11/1982 | Kastan ....................... 74/594.2 |
| 4,704,919 A | | 11/1987 | Durham |
| 5,088,340 A | * | 2/1992 | Seol ............................ 74/143 |
| 5,473,962 A | * | 12/1995 | Yamamoto .................. 74/594.1 |
| 5,493,937 A | | 2/1996 | Edwards |
| 5,496,126 A | * | 3/1996 | Lin ............................. 403/370 |
| 5,924,336 A | * | 7/1999 | Richardson ................ 74/594.1 |
| 5,961,219 A | | 10/1999 | Maughan |
| 6,443,033 B1 | | 9/2002 | Brummer et al. |
| 6,644,135 B1 | * | 11/2003 | Kishimoto et al. ..... 73/862.338 |
| 6,829,965 B1 | | 12/2004 | Mombrinie |
| 2005/0011302 A1 | * | 1/2005 | Wang et al. ................ 74/594.1 |
| 2005/0116438 A1 | * | 6/2005 | Wang et al. ................. 280/210 |
| 2006/0288817 A1 | * | 12/2006 | Lin ............................ 74/594.1 |

* cited by examiner

*Primary Examiner*—Vinh T. Luong
(74) *Attorney, Agent, or Firm*—Cislo & Thomas, LLP

(57) ABSTRACT

A bicycle sprocket crank assembly is comprised of first and second crank arms joined to a spindle. One of the crank arms and the spindle may be fabricated as a unitary structure, or both cranks arms may be formed as separate structures and joined together. In either case the spindle has at least a first coupling end with an internally tapped axial bore defined therein and the second crank arm forms at least a first socket at its axle end. At least a first wedging sleeve is provided and is disposed about the first coupling end of the spindle. The first wedging sleeve conforms to the shapes of both the first coupling end of the spindle and the hollow cavity in the first socket. Either the coupling end of the spindle or the hollow cavity is axially tapered, and the wedging sleeve is tapered to match. The wedging sleeve is split in an axial direction, so that as the first socket is drawn onto the first coupling end of the spindle, the wedging sleeve is increasingly forced in between the inner radial surface of the hollow cavity of the socket and the outer radial surface of the coupling end of the spindle.

12 Claims, 6 Drawing Sheets

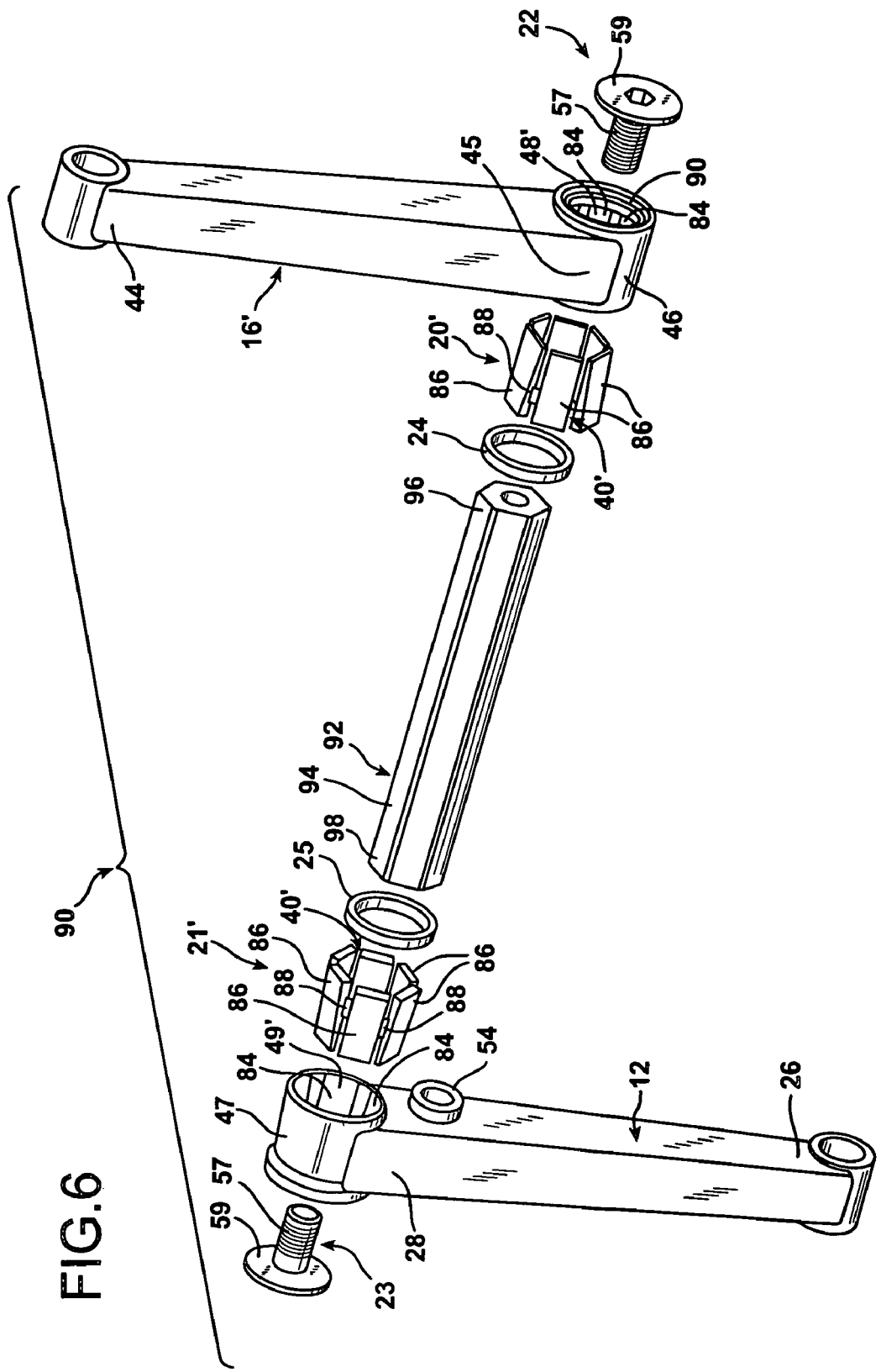

BICYCLE CRANK ASSEMBLY

BACKGROUND OF THE INVENTION

1. Field of the Invention

The present invention relates to bicycle pedal crank assemblies utilized to transmit power applied manually on the pedals of a bicycle to turn the bicycle wheels.

2. Description of the Prior Art

Many bicycles, including most BMX bicycles, employ bicycle crank sets that are comprised of three major structural components. These components include two "handed" crank arms, and one central, axial, connecting crank shaft, which is an axle and is also referred to as a spindle. To function properly, the assembled components of a bicycle pedal crank assembly must be torsionally stiff so that the relative orientation of the crank arms can be maintained to transmit all of the force applied into the pedaling drive. The joints between the components are usually expensive to produce and inherently add weight to the structure. Also, there are undesirable stress concentrations in most conventional bicycle pedal crank assembly designs.

Typical BMX bicycle pedal crank assemblies employ one of two different types of configurations. The first arrangement employs mating splines on the spindle and in corresponding sockets in the two crank arms. In this arrangement the sockets have an unbroken outer wall formed in the structure at the crank end of each of the crank arms. The other popular crank assembly configuration employs mating splines or mating flats on the spindle and arms, but with a radial opening defined in the wall surrounding each socket. The crank arms are provided with outer "pinch" clamping bolts that, when tightened, reduce the width of the gap at the radial openings in the socket walls.

The conventional spline system in which there is no radial gap in the socket wall has inherent problems. Specifically, the spline must have a good interference fit so that no "slop" or "wobble" of the crank arm relative to the spindle is possible during pedaling. With the correct interference fit, the oscillating direction of the torque applied during the pedal stroke cycles will not impose strains larger than those of the fit.

While this firm, structurally secure connection provides excellent force transmission characteristics and reduces stress in the bicycle pedal crank assembly components, disassembly of the crank assemblies is very difficult, even for experienced users. That is, the spline fit is so tight that it is extremely difficult to remove either crank arm from the spindle to repair or replace components parts of the bicycle pedal crank assembly, or of bicycle parts that are engaged by the assembly. If the "fit" of the spine is relaxed and the tolerance of fit between the external splines on the spindle and the internal splines on the crank arm sockets is increased, assembly and disassembly is easier. However, the increased tolerance in fit results in the cyclical pedal force producing wear upon both the sockets in the crank arms, and also the splines on the spindle. As a result, the entire assembly is loosened at regular intervals. Unwanted impact stresses are then produced on the spindle.

In the other popular conventional system in which pinch bolts are employed, the use of clamping bolts facilitates assembly and disassembly when the clamping bolts are loosened. Conversely, a very tight fit between the splines of the crank arm sockets and spindle ends can be achieved by tightening the pinch bolts. However, crank set designs that employ pinch bolts remove a substantial portion of the structural strength of material of each crank arm end surrounding the socket. This results from the radial split in the socket area of the crank arm that is already under high stress. "Pinch" bolt designs are also unpopular with many riders, both due to their physical appearance, and because of injuries that can result to the user while riding due to the additional mass at the coupling end of the crank arm necessary to house the pinch bolts.

SUMMARY OF THE INVENTION

The present invention provides a new and improved bicycle pedal crank assembly design. The system of the invention can be constructed in two versions. One version employs three major components, namely two crank arms and a spindle, all of which are separable from each other, as in conventional designs. However, the present invention differs from conventional systems in that the use of a spline connection is avoided. Rather, the couplings between the crank arms and the spindle involve tapered structures at either the ends of the spindle, or to the interior wall surfaces of the crank arm sockets. One of the joint elements of the joint between each of the crank arms and the spindle is a tapered joint element that diminishes in cross-sectional area with increased distance from the mating element. That is, either the coupling ends of the spindle are tapered, or the interior wall surfaces of the sockets are tapered. In either case a wedging member is interposed between the joint elements. The wedging member also has a tapered surface that resides in contact with and is tapered to conform to the tapered joint element. Also, the wedging member has a radial expansion slot defined therein.

A locking fastener member is provided for each crank arm and is engageable with the corresponding coupling end of the spindle. The wedging members may either be split bushings or sets of wedge-shaped shims circumferentially joined together by connecting webs. If the wedging member is formed of a set of tapered shims the locking member bears against the socket and draws the coupling end of the spindle into the coupling cavity of the socket. With this construction advancement of the locking member causes the circumferential spacings between the tapered shims to be reduced by deforming the connecting webs joining them together as the shims are forced toward the narrow end of the socket. If the wedging member is a split bushing the locking member bears against the widest end of the wedging member and forces it onto the tapered spindle. With this construction, advancement of the wedging member causes the gap formed at the radial split in the wedging member to increase, thus compressing the wedging member between the spindle and the interior surface of the corresponding socket.

In an alternative form of the invention, the spindle and one of the crank arms are formed together as a unitary structure. Consequently, a socket is formed at the pedal end of only the other crank arm so that a single joint exists in the bicycle pedal crank assembly. This single joint is comprised of a single coupling end of the spindle and a socket in only the crank arm that is removable from the spindle. In this system also, either the exterior surface of the coupling end of the spindle or the interior surface of the wall of the socket is tapered to accommodate the presence of a wedging member.

The wedging member may be either a split bushing or a set of wedge-shaped shims laterally joined together by connecting straps or webs. In either case, the single coupling end of the spindle can be forced into the socket with the taper of the wedging member conforming to the taper on either the coupling end of the spindle or on the interior wall surface of the socket. The single wedging member expands as the coupling end of the spindle is forced into it, but the expansion is opposed by the surrounding wall of the socket. As a consequence, the wedging member forms an extremely tight connection between the coupling end of the spindle and the socket of the crank arm.

The coupling arrangement in the two versions of the bicycle pedal crank assembly of the invention has several very significant advantages. In the two-piece construction in which one of the crank arms and the spindle are formed as a unitary structure, one of the costly, heavy joints is eliminated. It is possible to bore out the axle or spindle itself, thereby further reducing the overall weight in the system. The arm that must be removable for assembly and disassembly may or may not be the sprocket "drive side" arm of the bicycle.

The crank axle or spindle itself may be produced with a gentle taper at the end that is inserted into the socket formed in the removable crank arm. The coupling end of the spindle that is inserted into the socket is tapped internally along its axial center to receive a fastening or lock bolt. By fashioning the coupling end of the crank axle with a slight taper, the coupling end of the crank axle has a frustoconical configuration that can be produced in a single machining turning operation. Because the crank arm's spindle lug requires no specific timing splines or flats, this embodiment of the invention provides a system that greatly simplifies both manufacturing and assembly.

In this arrangement the socket of the mating crank arm is provided with a hollow, cylindrical coupling cavity that is slightly larger than the major diameter of the frustoconical coupling end of the axle. The hollow coupling cavity forming the axle socket in the removable crank arm is easier to machine than the sockets of conventional bicycle crank assemblies that require a precise timing alignment.

A split bushing having a cylindrical outer wall and a frustoconical inner wall is internally tapered to conform to the taper at the coupling end of the spindle. A radial split extends along the length of the bushing and allows it to expand when it is positioned about the coupling end of the spindle and within the socket of the removable crank arm when the coupling end of the spindle is forced into the socket. In this system, stress concentrations and wasted material surface areas are reduced to a minimum. As a result, a bicycle pedal crank assembly is produced that is lighter in weight and stronger than traditional designs. A lock bolt having an externally threaded shank is threadably engaged in the tapped bore in the coupling end of the spindle. When the lock bolt is tightened, the bushing is forced inward, expanding on the spindle and locking the crank arm in place.

The spindle may be provided with a single tapered coupling end if the spindle is produced as a unitary structure along with one of the crank arms. Alternatively, the spindle may be produced as a structure that is separable from both crank arms. In this "three-piece" arrangement both ends of the spindle are tapered and both of the crank arms are provided with sockets at their ends remote from the pedals. Both ends of the spindle are internally bored and tapped, and both receive fastening lock bolts to hold the two crank arms and both ends of the spindle tightly joined.

In another arrangement the socket is the tapered one of the two mating joint elements. With this construction the spindle is provided with at least one coupling end having a polygonal cross section of uniform cross-sectional area along its length. The tapered portion of the assembly joint is formed by the inside wall surface of the socket of the crank arm. The axle or spindle is left as a continuous, polygonal structure which may, for example, have six bearing faces. The tensioning bolt head always lies flush inside of the outboard crank arm recess resulting in a clean appearance. A hexagonal socket in the crank arm has a cross section that is tapered, but which matches the cross section of the coupling end of the spindle. That is, the matching polygonal cross sections of the coupling end or ends of the spindle have the same predetermined number and shape of polygonal surfaces as the planar, inclined surfaces on the interior socket wall. The sizes of the polygonal surfaces on the coupling end or ends and the socket or sockets are also quite close.

By utilizing a tapering polygonal socket, the crank arm provides a positive index for receiving the spindle. This system is easier for the user because the crank arms are always in diametric opposition to one another, oriented precisely one hundred eighty degrees apart relative to the spindle axis.

The wedging member may be formed as the same predetermined number of wedge-shaped shims laterally joined to each other by webs or flexible linking elements that connect the shims together for the purpose of assembly. The structure of the wedging member is such that it does not hinder the movement of the shims in a radial direction.

Each wedging sleeve employed in the version of the invention in which the coupling end or ends of the spindle and the hollow cavity of the socket or sockets have matching polygonal cross sections is assembled as a "skirt" of loosely joined wedging elements. Flexible links connect the wedging elements together for the purpose of holding them in an appropriate orientation so that together they form a longitudinally split wedging sleeve surrounding the coupling end of the spindle. The wedge elements of the wedging sleeve can be formed by forging the skirt in a flat strip in which the wedge-shaped shims are laterally joined by connecting webs. That is, the wedging sleeve may be formed as a flat linked chain. The wedging sleeve can be wrapped around it into a C-shape with a gap that is left open so that the wedging sleeve is split longitudinally in an axial direction.

One or both crank arms are thereby tightly clamped onto the spindle, thereby producing a bicycle sprocket crank assembly, the component members of which may be disassembled with relative ease. Nevertheless, when the fasteners are tightened, one or both crank arms are tightly clamped onto the mating ends of the spindle without any significant stress concentrations between the component members.

In the embodiments of the invention in which the first crank arm and spindle are formed as a single structure, the bicycle sprocket crank assembly is formed of only two major structural pieces. That is, it is formed with a first, generally L-shaped piece in which the spindle and first crank arm are either perpendicular to each other, or in which they reside at a relatively small obtuse angle relative to each other. The second major piece is the second crank arm.

In the two-piece version a large, smooth walled hole can be bored down the majority of the length of the spindle or axle, narrowing to a standard thread for the tensioning bolt, while keeping the strength in the polygonal length of the spindle. This offers a strength advantage that is approximately seventeen percent greater than a traditional, solid nineteen millimeter crank spindle. Furthermore, this construction saves a considerable amount of overall weight in the bicycle sprocket crank assembly.

A further advantage of the two-piece crank assembly is that it uses a single lock bolt. Conventional crank sets use anywhere from two to six lock bolts to assemble the crank arms together. A reduction in the number of bolts simplifies the assembly procedure for the user and reduces weight.

In one broad aspect the present invention may be considered to be a bicycle sprocket crank assembly comprising a first crank arm with an axially oriented spindle at one of its ends wherein the spindle has at least a first coupling end, a second crank arm, at least a first wedging sleeve, and at least a first threaded fastener. The first coupling end of the spindle has an internally tapped axial bore defined therein. The second crank arm has an axially oriented first socket at one of its ends. The first socket has a hollow cavity defined therein.

The first coupling end of the spindle fits into the hollow cavity of the first socket. The first coupling end and the hollow cavity are mating first elements, one of which is a first tapered element that narrows in area in an axial direction with increased distance from the first crank arm. The first wedging sleeve is disposed about the first coupling end of the spindle. The first coupling sleeve conforms to the shapes of both the first coupling end of the spindle and the hollow cavity and is axially tapered to match the taper of the first tapered element. The wedging sleeve is split in an axial direction and thereby radially expands as the first coupling end of the spindle is advanced into the hollow cavity of the first socket. That is, the wedging sleeve is split along its length longitudinally and in a direction parallel to the axis of the spindle.

The first coupling end of the spindle has an internally tapped axial bore defined therein. The first threaded fastener has a shank engaged in the internally tapped axial bore of the first coupling end and a head that immobilizes the spindle and the second crank arm relative to each other.

In different embodiments of the invention either the first coupling end of the spindle or the hollow cavity of the first socket may form the first tapered element. In those embodiments of the invention in which the coupling end of the spindle is the tapered element, the coupling end preferably has an outer radial surface of frustoconical shape. The wedging sleeve has an outer radial surface of cylindrical shape and an inner radial surface of frustoconical shape. The hollow cavity of the socket has a cylindrical annular inner wall that complete radially surrounds the first coupling end of the wedging sleeve. The wedging sleeve is preferably an internally tapered split bushing. In the two-piece embodiments of the invention the first crank arm and the shaft are formed together as a unitary structure.

In one preferred construction the thickest end of the tapered split bushing faces away from the first crank arm. The threaded fastener is a lock bolt with a head that seats upon the outboard annular face of the thickest end of the split bushing. The shank of the lock bolt is engaged in the internally tapped bore in the coupling end of the spindle so that tightening of the lock bolt urges the split bushing toward the first crank arm and radially outwardly, as well. Preferably, an annular stop spacer is disposed about the first coupling end of the spindle. The stop spacer resides in abutment against the inboard face of the first socket coaxially about the circular opening of the hollow cavity of the first socket.

In those embodiments of the invention in which the hollow cavity in the socket is the tapered element, the first coupling end of the spindle and the hollow cavity of the first socket both have matching polygonal cross sections. That is, the cross sections match because there are the same number of polygonal surfaces in both the first spindle end and the hollow cavity of the first socket. Also, the polygonal surfaces are of the same corresponding shapes and are preferably, but not necessarily, oriented at the same angular alignment with each other relative to the spindle axis. That is, when assembled the polygonal inwardly facing surfaces of the hollow cavity in the socket may be aligned around the spindle at the same radial positions as the outwardly facing surfaces on the coupling end of the spindle.

A predetermined number of planar, outwardly facing wedge contact surfaces are defined on both the first coupling end and in the hollow cavity of the first socket. The first wedging sleeve is formed as a set of wedge-shaped shims laterally linked to each other by connecting webs or straps. Each of these shims is shaped as a right triangular prism. The wedge-shaped shims are laterally linked together and disposed about the first coupling end to reside in face to face contact with the flat contact surfaces of both the first coupling end and the hollow cavity of the first socket. The wedge-shaped shims and the connecting webs are formed as a unitary structure in which the wedge-shaped shims are oriented in a C-shaped configuration about the first coupling end of the spindle.

Preferably also, an annular stop spacer is disposed about the first coupling end. The annular stop spacer resides in abutment against the inboard faces of the thickest ends of the wedge-shaped shims of the first wedging sleeve.

In the three-piece embodiment of the invention, the first and second crank arms and the spindle are formed as three separate elements that are coupled together. In these embodiments the spindle also has a second coupling end, in addition to the first coupling end. In the three-piece embodiments of the invention the first crank arm defines a second socket at its end at which the spindle is located. The second socket also has a hollow cavity defined therein. The second coupling end of the spindle fits into the hollow cavity of the second socket. The second coupling end of the spindle and the hollow cavity of the second socket are mating second elements, one of which is a second tapered element that narrows in area in an axial direction with increasing distance from the second crank arm.

A second wedging sleeve is disposed about the second coupling end of the spindle. The second coupling sleeve conforms to the shape of both the second coupling end of the spindle and the hollow cavity of the second socket. The second wedging sleeve is axially tapered to match the taper of the second tapered element. The second wedging sleeve is split longitudinally in a direction parallel to the spindle axis so that it will radially expand as the second coupling end of the spindle is advanced into the hollow cavity of the second socket. A second threaded fastener is provided having a shank engaged in the internally tapped axial bore of the second coupling end of the spindle. The second threaded fastener also has a head that immobilizes the spindle and the first crank arm relative to each other.

In some of the three-piece embodiments the second coupling end of the spindle is the second tapered element. Preferably, in these embodiments the second coupling end of the spindle has an outer radial surface of frustoconical shape. The second wedging sleeve has an outer radial surface of cylindrical shape and an inner radial surface of frustoconical shape. The hollow cavity of the second socket has a cylindrical, annular inner wall that completely radially surrounds the second coupling end and the second wedging sleeve. The second wedging sleeve is an internally tapered split bushing.

In some of the three-piece bicycle crank assembly embodiments the hollow cavity of the second socket is the second tapered element. In these embodiments the second coupling end of the spindle and the hollow cavity of the second socket both have matching polygonal cross sections. The same predetermined number of mutually facing wedge contact surfaces are defined on both the second coupling end and in the hollow cavity of the second socket. These surfaces are angularly aligned relative to each other. The flat, polygonal faces of the interior wall of the hollow cavity of the second socket are aligned radially with the flat, outwardly facing surfaces on the second coupling end of the spindle. The second wedging sleeve is formed as a set of wedge-shaped shims, each shaped as a right triangular prism, and laterally linked to each other by connecting webs. The wedge-shaped shims and the connecting webs of the second wedging sleeve are formed together as a unitary structure in which the wedge-shaped shims are oriented in a C-shaped configuration about the second coupling end of the spindle.

In another broad aspect the invention may be considered to be a bicycle crank assembly comprising a first crank arm having an axially oriented spindle at one of its ends, a second crank arm, and a wedging sleeve. A first fastening element is formed at the first coupling end of the spindle. A second fastening element is engaged with the first fastening element to immobilize the second crank arm relative to the spindle.

The second crank arm has at one of its ends an axially oriented socket with a hollow cavity defined therein. This hollow cavity receives the first coupling end of the spindle. A selected one of these two elements is a tapered element that narrows in area in axial direction with increased distance from the first crank arm. The wedging sleeve is disposed about the coupling end of the spindle and is tapered to conform in shape to the tapered element. The wedging sleeve is located within the hollow cavity. The wedging sleeve is split longitudinally to permit it to expand radially outwardly as the first coupling end of the spindle is forced into the hollow cavity. This action frictionally engages both the first coupling end of the spindle and the socket to prevent relative rotation therebetween. The second fastening element is engaged with the first fastening element to immobilize the second crank arm relative to the spindle.

In still another broad aspect the invention may be considered to be a bicycle pedal crank assembly comprising a first crank element, a spindle, a second crank element, a first wedging member, and a locking member. The first radially oriented crank arm has opposing axle and pedal ends. The spindle extends axially from the first crank element arm at the axle end thereof. The spindle has an axle portion and at least a first coupling end remote from the first crank arm. The second crank arm has opposing axle and pedal ends. At least a first axle socket is located in the second crank arm at the axle end thereof. The axle socket has a hollow coupling cavity defined therein.

The first coupling end and the hollow coupling cavity are mutually interengageable joint elements. One of the joint elements is tapered and diminishes in cross-sectional area with increased distance from the first crank element.

The first wedging member is interposed between joint elements. The first wedging member has a tapered surface residing in contact with and tapered to conform to the tapered joint element. The first wedging member has a radial expansion gap defined therein. As the coupling end of the spindle is forced into the socket, the expansion gap widens and permits expansion of the wedging member. The wedging member is expanded radially outwardly and is tightly pressed radially between both the first coupling end of the spindle and the coupling cavity. The locking member is releaseably engageable with the first coupling end of the spindle. The locking member draws the coupling end of the spindle into the coupling cavity. As a result, the first wedging member immobilizes the first coupling end of the spindle relative to the coupling cavity.

The invention may be described with greater clarity and particularity by reference to the accompanying drawings.

DESCRIPTION OF THE DRAWINGS

FIG. 6 is an exploded perspective view of a three-piece bicycle sprocket crank assembly in which the hollow coupling cavities in the opposing sockets of the crank arms are the tapered elements.

DESCRIPTION OF THE EMBODIMENTS

Figure 1:
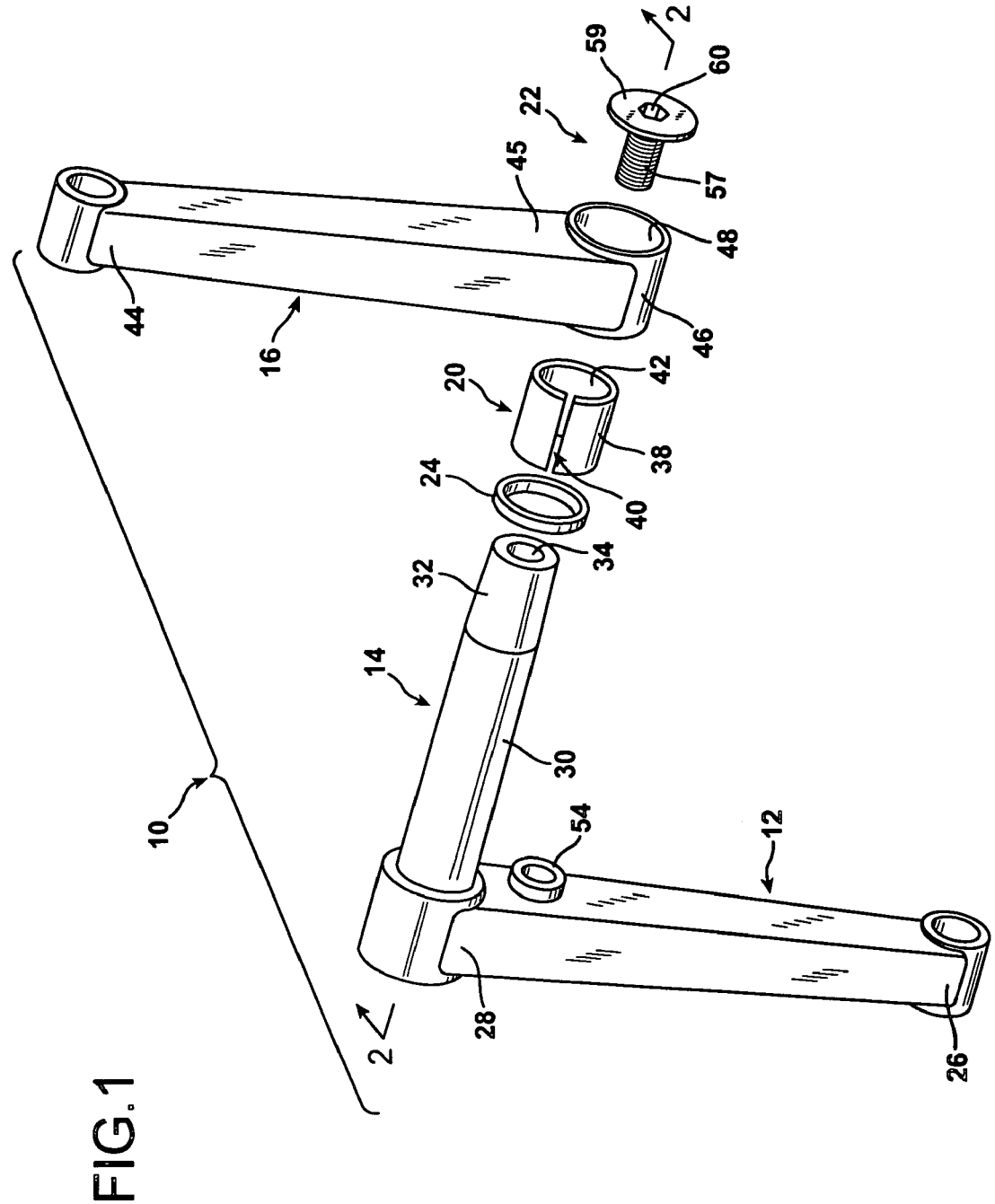
FIG. 1 is a an exploded perspective view illustrating a two-piece bicycle sprocket crank assembly in which the first and only coupling end of the spindle is the tapered joint element.
Figure 2:
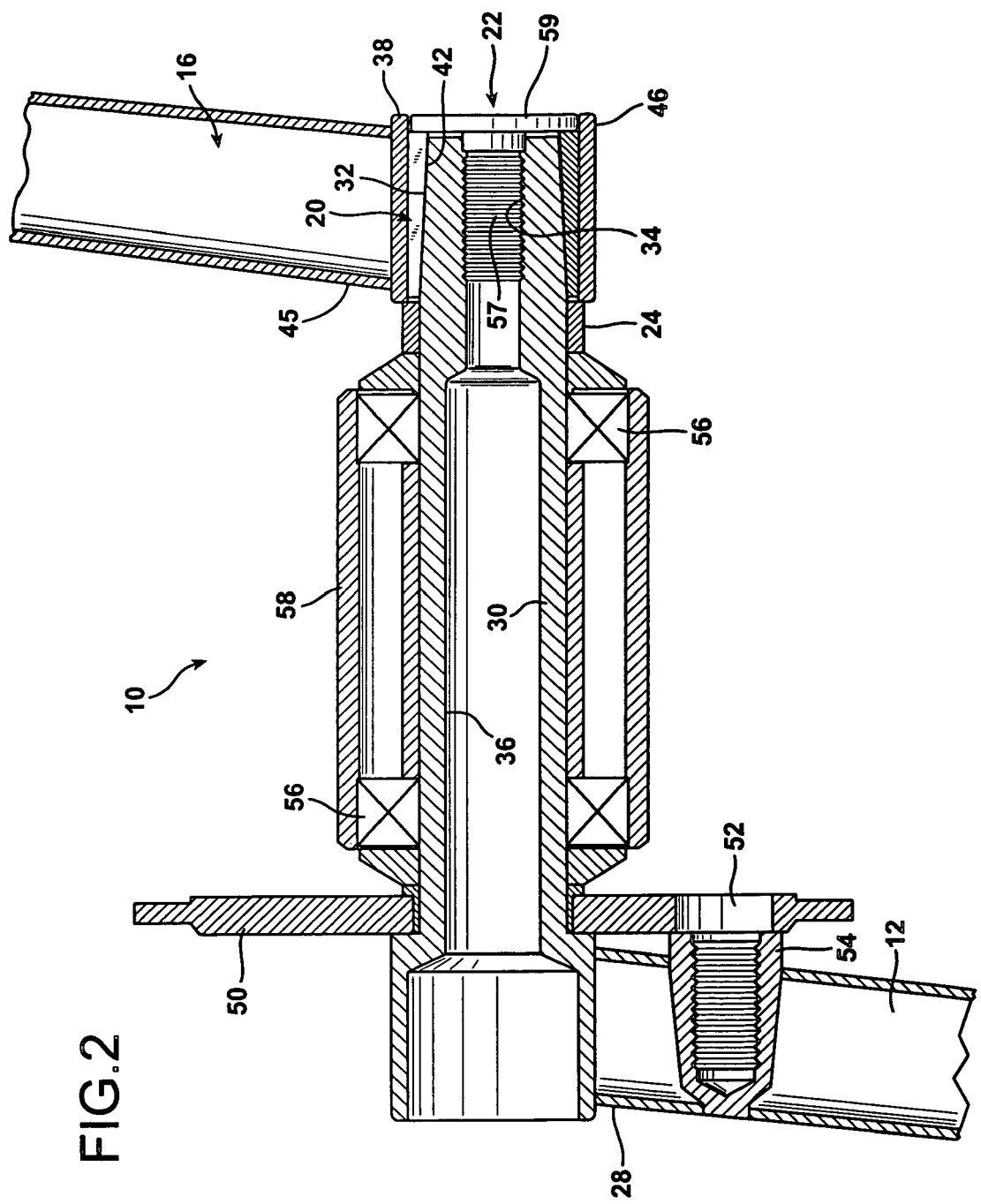
FIG. 2 is a sectional elevational view of the bicycle sprocket crank assembly taken along the lines 2-2 of FIG. 1.

FIGS. 1 and 2 illustrate a two-piece bicycle sprocket crank assembly 10 in which the first crank arm 12 and the axle or spindle 14 are formed together as a unitary metal structure, and in which the second crank arm 16 is formed as separate structure. The two crank arms 12 and 16 and the spindle 14 are formed of 4130 chromium-molybdenum steel alloy. The first crank arm 12 is permanently joined to the spindle 14, while the second crank arm 16 is removable from the spindle 14. In addition to the two major structural components, the bicycle sprocket crank assembly 10 is also comprised of a first, single, metal wedging sleeve 20, a first, single, metal threaded fastener 22, and a metal stop spacer 24.

The first crank arm 12 has a pedal end 26 at which a bicycle pedal is mounted in a conventional fashion, and an opposing axle end 28. The first crank element or arm 12 is radially oriented relative to the spindle 14 which extends axially therefrom at the axle end 28 of the crank arm 12. The spindle 14 has an axle portion 30 and a first coupling end 32, which is the only coupling end in the two-piece embodiment of the bicycle pedal crank assembly 10. The coupling end 32 of the spindle 14 has an internally tapped axial bore 34 drilled into it. Actually, as illustrated in FIG. 2, a large, stepped cylindrical hole 36 is bored into the spindle 14 from the axle end 28 of the first crank arm 12 throughout the length of the spindle 14. The central, longitudinal, axial hole 36 is a stepped bore that narrows in diameter at the coupling end 32 and terminates in the internally tapped threaded bore 34 which has a standard thread for the tensioning or fastening bolt 22. By forming the axial hole 36 in the spindle 14 a significant weight reduction is achieved in the bicycle sprocket crank assembly 10, while still preserving the necessary structural strength in the spindle 14.

The outer surface of the coupling end 32 of the spindle 14 is tapered at an angle of about five degrees from axial alignment, although the angle of taper can be greater or smaller. The annular cross-sectional area of the tapered coupling end 32 of the spindle 14 narrows in an axial direction with increasing distance from the first crank arm 12. The coupling end 32 has an outer radial surface of frustoconical shape, as illustrated in FIGS. 1 and 2.

The first and only wedging sleeve 20 of the bicycle sprocket crank assembly 10 has an otherwise cylindrical radial outer surface 38, but is split longitudinally and in a direction parallel to the axis of the spindle 14, whereby a longitudinal gap 40 is defined in the annular structure of the wedging sleeve 20. The radial inner surface 42 of the wedging sleeve 20 has a frustoconical shape that matches that of the coupling end 32 of the spindle 14. That is, the radial inner surface 42 of the wedging sleeve 30 is tapered at a angle of about five degrees and diminishes in diameter with increased distance from the first crank arm 12. The angle of taper can vary, but must match the taper of the coupling end 32 of the spindle 14. The first wedging sleeve 20 is thereby formed as an internally tapered split bushing.

The second crank arm 16 is an elongated structure that has a pedal end 44 to which a bicycle pedal is attached in a conventional fashion, and an opposite axle end 45. A cylindrical, axial opening is defined in the axle end 45. The axle end 45 of the second crank arm 16 thereby forms a first socket 46 with a hollow cavity 48 of cylindrical shape defined therein. The diameter of the cylindrical cavity 48 is only slightly greater than the nominal outer diameter of the radial outer surface 38 of the internally tapered split bushing 20.

The first coupling end 32 of the spindle 14 and the hollow cavity 48 of the first socket 46 are mating first joint elements. The wedging sleeve 20 is disposed about the first coupling end 32 of the spindle 14 and is interposed between the first joint elements, namely the coupling end 32 and the hollow cavity 48. The tapered inner surface 42 of the wedging sleeve 20 resides in contact with and conforms to the tapered surface of the coupling end 32 of the spindle 14. The radial outer surface 38 of the wedging member 20 conforms to the cylindrical surface of the cavity 48 so that the wedging sleeve 20 conforms to the shapes of both the coupling end 32 of the spindle 14 and the hollow cavity 48 of the socket 46. Since the wedging sleeve 20 is split in an axial direction at the gap 40, it radially expands within the socket 46 as the first coupling end 32 of the spindle 14 is advanced into the hollow cavity 48 of the socket 46.

To assemble the components of the bicycle crank assembly 10 on a bicycle, the bicycle sprocket 50, shown in FIG. 2, is first mounted on the spindle 14 and pushed all the way up against the shoulder formed by the axle end 28 of the first crank arm 12, as shown in FIG. 2. The sprocket 50 is thereupon secured relative to the first crank arm 12 and spindle 14 by a bolt 52, the threaded shank of which is engaged in an internally tapped boss 54 on the first crank arm 12 near the axle end 28 thereof.

The spindle 14 is then inserted through bearings in annular cups 56 that are located within the annular bottom bracket shell 58 that forms a part of the bicycle frame. The spindle 14 is inserted into the bottom bracket shell 58 from the drive side thereof which is typically the left side, as viewed from the rear of the bicycle when the bicycle is turned upside down and as shown in FIG. 2. The coupling end 32 of the spindle 14 therefore protrudes to the right, beyond the bicycle bottom bracket shell 58. The stop spacer 24 is then pushed onto the coupling end 32 of the spindle 14 all the way up against the cup assembly 56 on that side of the bottom bracket shell 58. The second crank arm 16 is then mounted to the spindle 14 by sliding the socket 46 over the coupling end 32 of the spindle 14, toward the first crank arm 12. The user must then be sure that the first and second crank arms 12 and 16 extend in diametrically opposite directions relative to the spindle 14. The wedging sleeve 20 is then manually pushed into the gap between the socket 46 and the coupling end 32 of the spindle 14 as far as possible. Manual force is effective only up to the point at which the wedging sleeve 20 must expand in order to be advanced further. The threaded shank 57 of the fastening lock bolt 22 is then inserted into the internally tapped bore 34 and the shank of the bolt 22 is threadably advanced, thus further compressing the wedging sleeve 20. In the embodiment illustrated, the fastening bolt 22 has an axial allen head drive well 60 in the bolt head 59 so that the bolt 22 can be advanced toward the first crank arm 12 utilizing an allen head wrench.

As the lock bolt 22 is advanced to the left, as illustrated in FIG. 2, its shank 57 is engaged in the internally tapped axial bore 34 of the first coupling end 32 of the spindle 14. The bolt head 59 of the lock bolt 22 bears axially against the outboard, thickest end of the split bushing wedging sleeve 20, thereby forcing it along the outer surface of the coupling end 32 of the spindle 14, toward the axle end 28 of the first crank arm 12.

As the fastening bolt 22 is advanced, the bolt head 59 bears axially against the wedging sleeve 20. The advance of the fastening lock bolt 22 draws the coupling end 32 of the spindle 14 into the coupling cavity 48 of the socket 46 in the second crank arm 16. As the wedging member 20 is forced toward the axle end 28 of the first crank arm 12, the gap 40 in the split bushing 20 widens. The split bushing 20 is thereby forced further onto the coupling end 32 of the spindle 14. The width of the gap 40 continues to increase as the structure of the wedging sleeve 20 expands radially outwardly due to the interaction between the tapered surfaces of the coupling end 32 and the wedging sleeve 20. With sufficient advancement of the lock bolt 22, the coupling end 32 of the spindle 14 is totally immobilized from rotation relative to the coupling cavity 48. The spindle 14 and the second crank arm 16 are thereby totally immobilized relative to each other. The stop spacer 24 bears against the crank assembly bearing 56 and the socket 46 of the second crank arm 16, as illustrated in FIG. 2.

Although the second crank arm 16 is thereby locked onto the spindle 14, it is readily removable therefrom. Removal is achieved by unscrewing the lock bolt 22 and tapping the second crank arm 16 with light blows in an outboard direction, away from the first crank arm 12. The second crank arm 16 will thereupon readily come free from the spindle 14.

Figure 3:
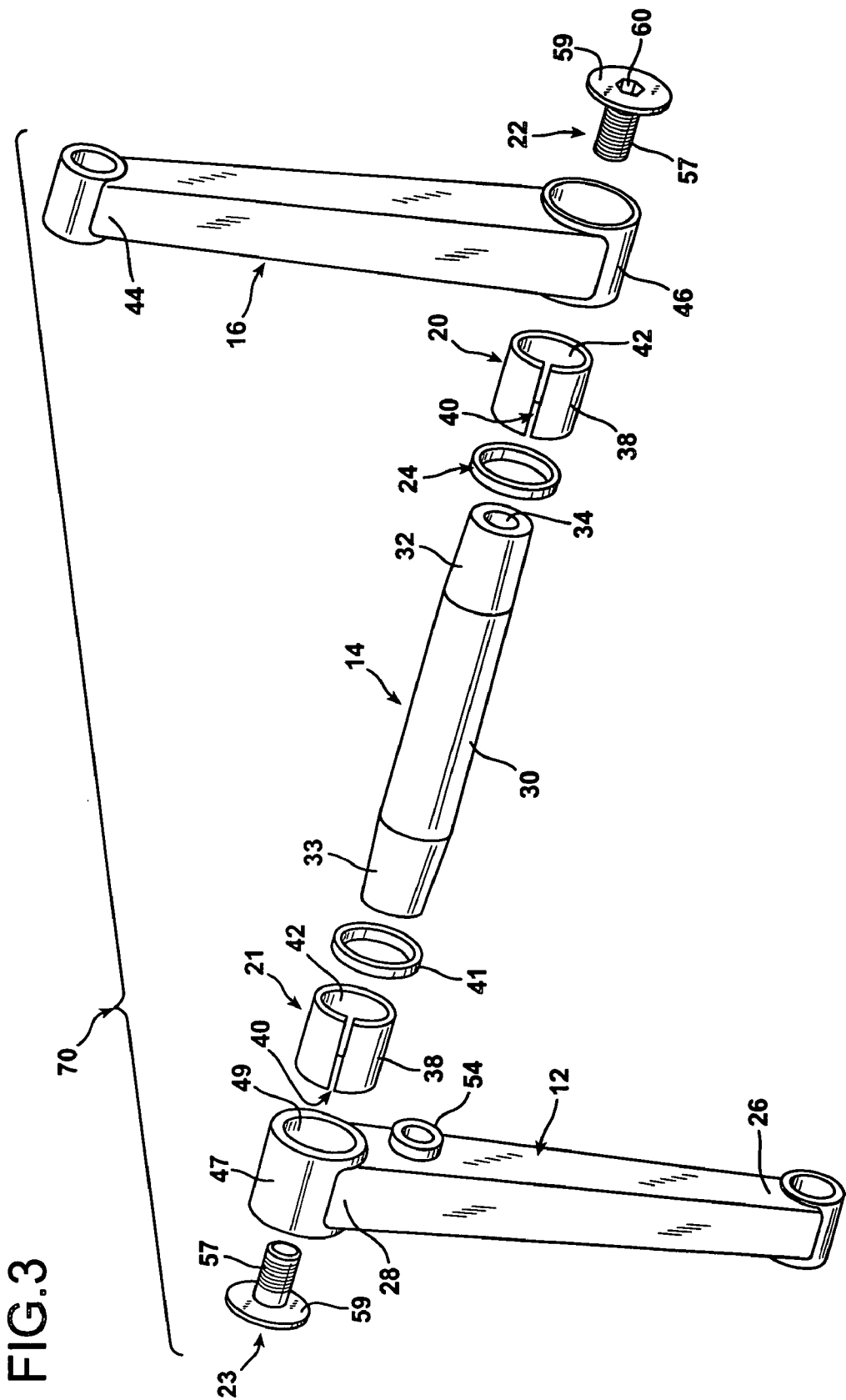
FIG. 3 is an exploded perspective view of a three-piece bicycle sprocket crank assembly in which the opposing first and second coupling ends of the spindle are the first and second tapered elements.

FIG. 3 illustrates a different embodiment of the invention in which the bicycle pedal crank assembly 70 has three major, structural components. The bicycle crank assembly 70 is referred to herein as a three-piece unit.

The bicycle pedal crank assembly 70 includes all of the elements of the bicycle crank assembly 10, but differs from that embodiment in that the first crank arm 12 and the spindle 14' are formed as separate structural pieces. The spindle 14' therefore also has a second, tapered coupling end 33, in addition to its first tapered coupling end 32. Also, a second socket 47 is formed in the first crank arm 12 at its axle end 28. The second socket 47 also has a hollow cylindrical coupling cavity 49 defined therein. The second coupling end 33 of the spindle 14' fits into the hollow cavity 49 of the second socket 47, so that the second coupling end 33 and the hollow cavity 49 of the second socket 47 are mating second elements, one of which is a second tapered element that narrows in area in axial direction with distance from the second crank arm 16. More specifically, the second coupling end 33 is identical in structure to the first coupling end 32, while the hollow cavity 49 in the second socket 47 is identical in structure to the hollow cavity 48. Therefore, the second tapered element is the tapered second coupling end 33 of the spindle 14'.

A second wedging sleeve 21, which is identical to the first wedging sleeve 20 is disposed about the second coupling end 33 of the spindle 14'. The second wedging sleeve 21 has a substantially cylindrical outer surface 38 and also has a radial gap 40 defined in it extending axially along its length. The interior surface 42 of the second wedging sleeve 21 has a frustoconical shape that conforms to the size and shape of the outer surface of the second coupling end 33.

A lock bolt fastener 23, identical to the lock bolt fastener 22, is used to secure the first crank arm 12 to the spindle 14'. Internally tapped threaded bores 34 are defined in both of the opposing first and second coupling ends 32 and 33 of the spindle 14'. The first crank arm 12 is thereby secured to the spindle 14', and immobilized from rotation relative thereto, in the same manner and utilizing the same structural interrelationship that exists between the second crank arm 16 and the spindle 14' in the two-piece bicycle sprocket crank assembly 10. That is, the head 59 of the second lock bolt 23 bears axially against the outer, thickest end of the second wedging sleeve 21, while a second stop spacer 41 bears against the facing surface of the second socket at the axle end 28 of the first crank arm 12 when the lock bolt 23 is tightened. Advancement of the threaded shank of the lock bolt 23 into the internally tapped bore 34 within the second coupling end 33 forces the second wedging sleeve 21 onto the second coupling end 33 and toward the second crank arm 16. This action also forces the second wedging sleeve 21 toward the second crank arm 16, thereby expanding it so that the second wedging sleeve 21 is clamped in between the second socket 47 and the second coupling end 33 of the spindle 14'. This action immobilizes the spindle 14' and the first crank arm 12 relative to each other.

Figure 4:
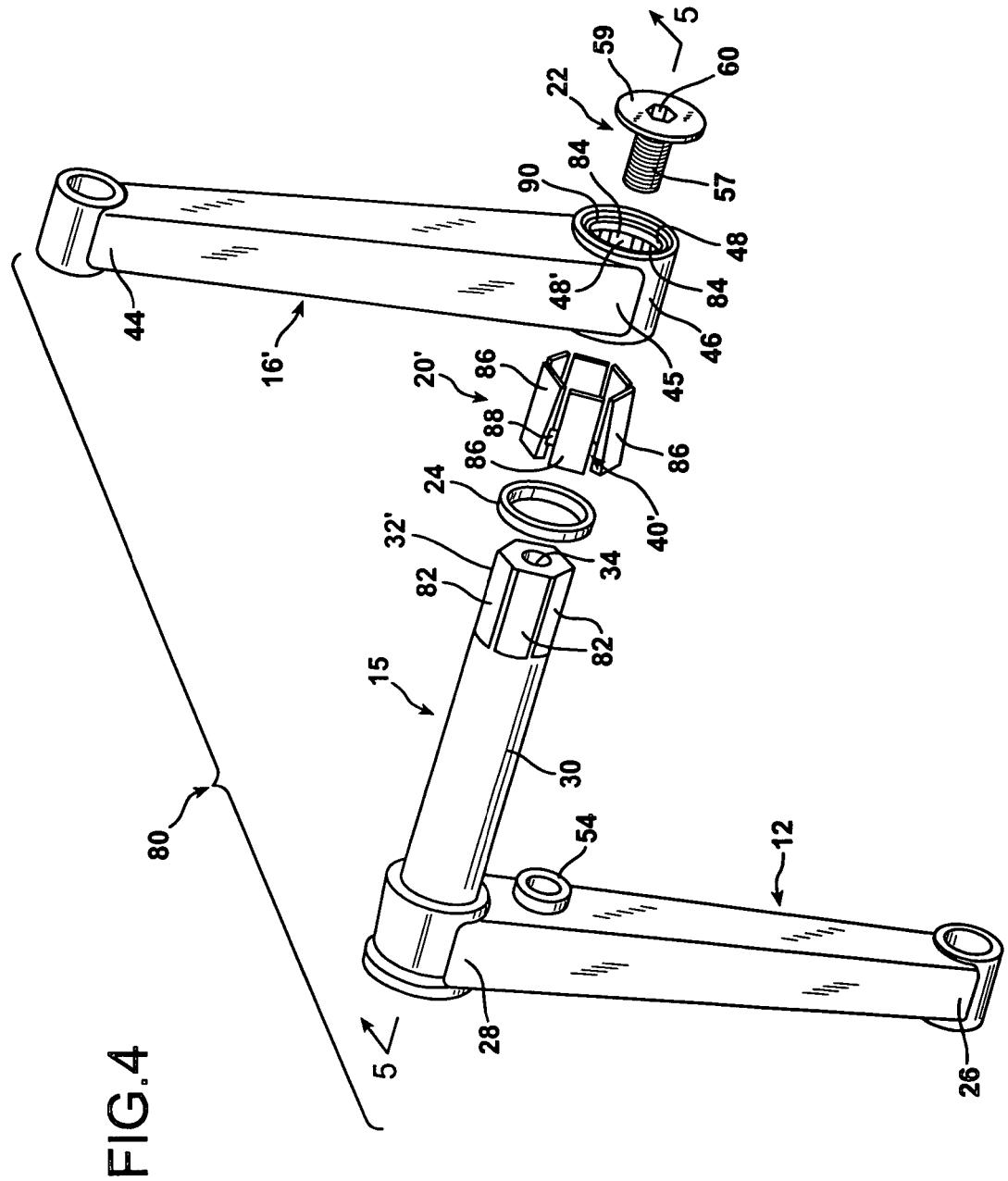
FIG. 4 is an exploded view of a two-piece bicycle sprocket crank assembly according to the invention in which the hollow coupling cavity in the socket of the second coupling arm is the tapered joint element.
Figure 5:
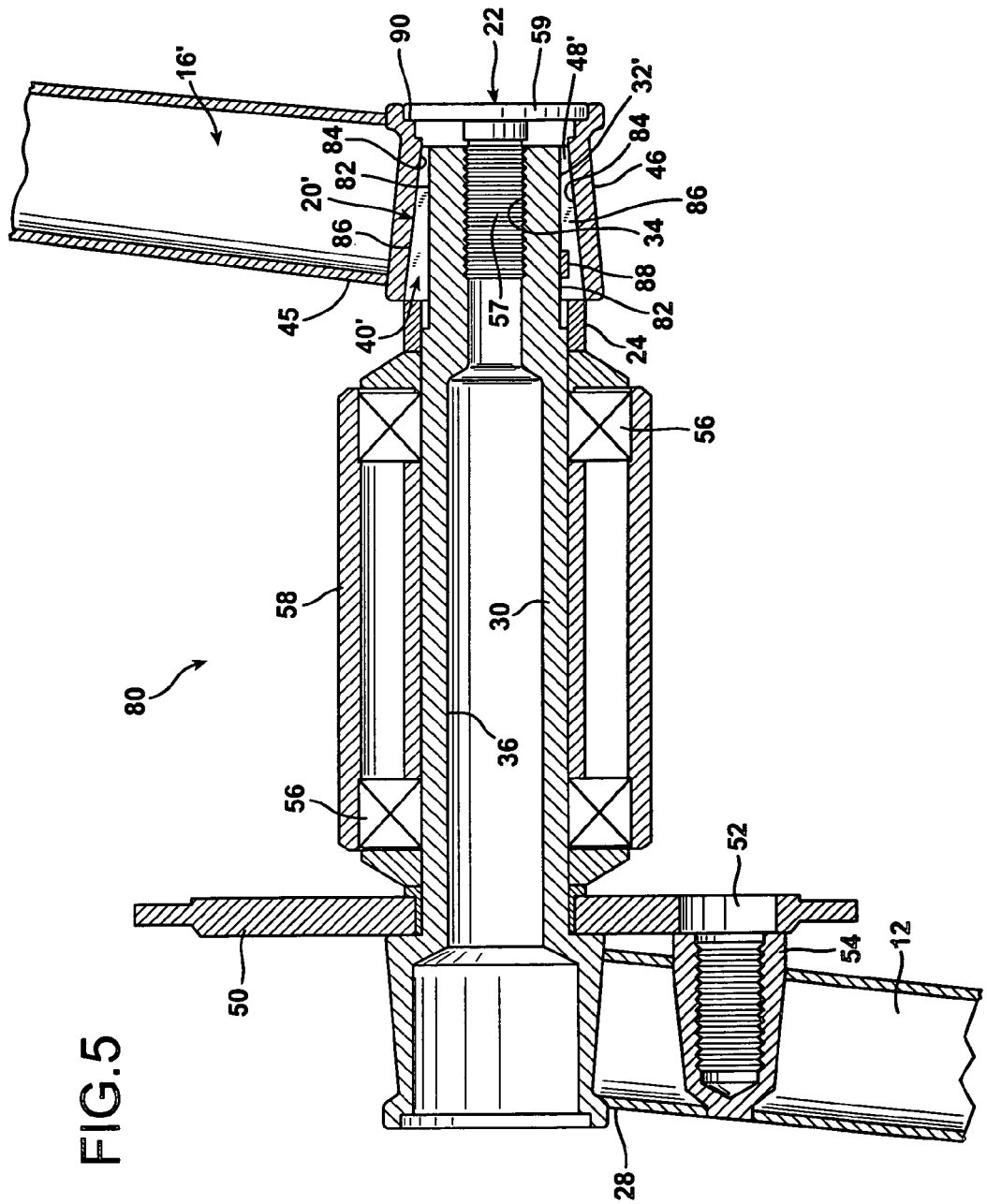
FIG. 5 is a sectional elevational view of the bicycle sprocket crank assembly taken along the lines 5-5 of FIG. 4.

FIGS. 4 and 5 illustrate an alternative embodiment of a two-piece bicycle pedal crank assembly 80. The bicycle pedal crank assembly 80 differs in certain respects from the bicycle crank assembly 10 illustrated in FIGS. 1 and 2. Like the bicycle pedal crank assembly 10, the bicycle pedal crank assembly 80 includes a first crank arm 12 integrally formed with a spindle 15. A second crank arm 16' is formed as a separate structure. The first crank arm 12 has a pedal end 26 and an axle end 28. Likewise, the second crank arm 16' has a pedal end 44 and also an axle end 46 that forms the first and only socket in the bicycle pedal crank assembly 80. A first and only threaded locking fastener bolt 22 is provided for the bicycle crank assembly 80.

The bicycle crank assembly 80 differs from the bicycle pedal crank assembly 10 in that the hollow cavity 48' of the first socket 46 in the second crank arm 16' is tapered and narrows in cross-sectional area in an axial direction with increased distance from the first crank arm 12. The first coupling end 32' of the spindle 15 and the hollow cavity 48' both have matching, polygonal cross sections. The first coupling end 32' of the spindle 15 is not tapered, but is of constant cross section throughout. The first coupling end 32' is of uniform, polygonal, annular cross section throughout its length and has six flat, outwardly facing wedge contact surfaces 82 arranged about its circumference. The flat wedge contact surfaces 82 all have a rectangular shape and are formed as flat areas about the circumference of the first coupling end 32' of the spindle 15.

The hollow coupling cavity 48' defined within the first socket 46 is a tapered element and is formed with the same predetermined number of wedge contact surfaces. Specifically, six flat, rectangular wedge contact surfaces 84 are defined about the interior circumference of the hollow cavity 48'. The flat, inwardly facing wedge contact surfaces 84 are inclined at an angle of five degrees relative to axial alignment, although the extent of taper can be varied. The cross-sectional area of the hollow cavity 48' is smallest adjacent the head 59 of the fastening bolt 22, and greatest at its opposite end facing the first crank arm 12. The flat wedge contact surfaces 84 of the hollow cavity 48' and the flat wedge contact surfaces 82 of the first coupling end 32' of the spindle 15 are angularly aligned with each other, relative to the axis of the spindle 15. That is, each wedge contact surface 84 in the hollow coupling cavity 48' is located in radial alignment with a corresponding wedge contact surface 82 on the first coupling end 32' of the spindle 15.

In the bicycle sprocket crank assembly 80, the wedging sleeve 20' is formed as a set of wedge-shaped shims 86 laterally linked to each other by connecting webs or straps 88. The wedge-shaped shims 86 are each configured in the shape of a triangular prism. The wedge-shaped shims 86 are linked together with a relatively loose connection that allows for relative radial movement between elements, and are disposed about the first coupling end 32' of the spindle 15 to reside in face to face contact with the contact surfaces 82 on the first coupling end 32' of the spindle 15 and the opposing wedge contact surfaces 84 of the hollow cavity 48'. As illustrated in FIG. 5, the thickness of the shims 86 is greatest at the ends thereof facing the first crank arm 12, and thinnest at the ends thereof most distant from the first crank arm 12.

The first wedging sleeve 20' is formed as a unitary structure in which the wedge-shaped shims 86 and the laterally extending connecting webs 88 are all forged together as a flat linked chain, and then bent at the coupling webs 88 into a C-shaped configuration, as illustrated. The wedge-shaped shims 86 are all joined at their mutually facing edges, except at a longitudinal gap 40'. The gap 40', in which there is no connecting web 88, forms a split in the otherwise encircling structure of the first wedging sleeve 20'. The wedge-shaped shims 86 are disposed about the first coupling end 32' of the spindle 15 and reside in face to face contact with the wedge contact surfaces 82 of the first coupling end 32'.

The structural piece comprised of the first crank arm 12 and the spindle 15 and the second structural element formed by the second crank arm 16' are assembled onto a bicycle and relative to each other in much the same manner as described with the embodiment of FIGS. 1-2. Specifically, the spindle 15 is inserted through the cups 56 and within the bottom bracket shell 58 on the bicycle frame. The stop spacer 24 is then slipped over the coupling end 32' of the spindle 15. The C-shaped cluster of wedge-shaped shims 86 is then inserted onto the first coupling end 32' of the spindle 15. The radially inwardly facing surfaces of the wedge-shaped shims 86 reside in direct, face to face contact with the radially outwardly facing flat surfaces 82 on the first coupling end 32' of the spindle 15. The radially outwardly facing surfaces of the wedge-shaped shims 86 also reside in direct face to face contact with the radially inwardly facing wedge contact surfaces 84 of the hollow cavity 48'. The second crank arm 16' is then attached to the coupling end 32' of the spindle 15 by pressing the socket 46 toward the first crank arm 12 and onto the wedging sleeve 20'. The second crank arm 16' is oriented so that it is directed in a diametrically opposite direction from the first crank arm 12 relative to the axis of the spindle 15. The polygonal shape of both the coupling end 32' and the hollow cavity 48' ensure proper alignment in this regard.

Once the socket 46 has been manually pushed partway onto the wedging sleeve 20', which in turn is mounted upon the coupling end 32' of the spindle 15, the threaded shank 57 of the fastening lock bolt 22 is screwed into the bore 34 in the coupling end 32'. In this embodiment the underside of the head 59 of the fastening lock bolt 22 bears against a shoulder 90 defined on the outwardly facing side of the socket 46. The stop spacer 24 bears against the thickest ends of the wedge-shaped shims 86, as illustrated in FIG. 5.

Continued advancement of the fastening lock bolt 22 forces the second crank arm 16' further onto the spindle 15 and toward the axle end 28 of the first spindle 12. Continued threaded advancement of the fastening bolt 22 also causes the contact faces 84 within the hollow cavity 48' of the socket 46 to clamp the wedging sleeve 20' tightly against the outwardly facing surfaces 82 of the coupling end 32' of the spindle 15. Advancement of the locking screw 22 causes the wedging shims 86 to tightly engage the second crank arm 16' relative to the spindle 15, thereby immobilizing the first and second crank arms 12 and 16' relative to each other and clamping the second crank arm 16 tightly onto the spindle 15.

The bicycle sprocket crank assembly 90 illustrated in FIG. 6 is another three-piece embodiment of the invention. In the bicycle crank assembly 90, the spindle 92 and the first crank arm 12 are formed as separate, independent structures. The bicycle sprocket crank assembly 90 employs a first crank arm 12 having a pedal end 26 and an opposite axle end 28 which forms a second socket 47, in addition to the first socket 46. Like the first socket 46 in the bicycle sprocket crank assembly 80, the second socket 28 also has a hollow cavity 49' of polygonal cross section. The hollow cavities 48' and 49' are constructed identically to each other.

The spindle 92 is of a uniform outer cross-sectional, polygonal shape throughout and has six major outwardly facing wedge contact surfaces 94 on its outer surface that extend throughout its length. The spindle 92 has opposing ends 96 and 98. The end 96 may be considered to be a first coupling end, while the opposing end 98 may be considered to be a second coupling end.

The second crank arm 16' with its socket 46 defining a tapered, hollow cavity 48' is the same member employed in the bicycle sprocket crank assembly 80. The second socket 47 at the axle end 28 of the first crank arm 12 also forms an identical, tapered, hollow cavity 49' facing in the opposite direction, the cross-sectional open area of which is greatest in the direction facing the second crank arm 16', and smallest in the direction facing the head 59 of the lock bolt fastener 23. The bicycle sprocket assembly 90 employs a second wedging sleeve 21', which is identical in structure to the wedging sleeve 20' employed in the bicycle sprocket crank assembly 80. The bicycle sprocket crank assembly 90 also includes a second stop spacer 25 at the second coupling end 98 of the spindle 92, in addition to the stop spacer 24 employed at the first coupling end 96 of the spindle 92.

The stop spacer 24, the first wedging sleeve 20' and the first socket 46 are all secured together by the first lock bolt fastener 22 as explained in the description of the bicycle sprocket crank assembly 80. The second socket 47 and the second wedging sleeve 21', along with the stop spacer 25, are all secured to the second coupling end 98 of the spindle 92 by the second lock bolt fastener 23 in the same manner. That is, the stop spacer 25 is inserted onto the second coupling end 98 of the spindle 92 and resides against the adjacent bearing cup 56. The second wedging sleeve 21' with its C-shaped cluster of wedge-shaped shims 86 is inserted onto the second coupling end 98 of the spindle 92 with the thickest ends of the wedge-shaped shims 86 facing the second crank arm 16'. The stop spacer 25 resides in abutment against the thickest ends of the wedge-shaped shims 86.

The first crank arm 12 is then attached to the second coupling end 98 of the spindle 92 by sliding the second socket 47 onto the narrow ends of the wedge-shaped shims 86. The threaded shank 57 of the second lock bolt fastener 23 is then engaged in the internally tapped bore 34 within the second coupling end 98 and advanced until its head 59 bears against a shoulder defined within the socket 47. Continued advancement of the second lock bolt fastener 23 presses the socket 47 onto the second coupling end 98 with the second 20 wedging sleeve 21' interposed therebetween. Continued advancement of the lock bolt fastener 23 causes the wedge-shaped shims 86 to become tightly wedged in between the inwardly facing trapezoidal contact surfaces 84 of the hollow coupling cavity 49', and the radially aligned, outwardly facing surfaces 94 on the second coupling end 98 of the spindle 92. As the second lock bolt fastener 23 is advanced further, the second socket 47 becomes tightly clamped onto the second coupling end 98 of the spindle 92 due to the wedging action of the wedge-shaped shims 86.

In joining the second socket 28 of the first crank arm 12 onto the second coupling end 98 of the spindle 92 care is taken to ensure that the first crank arm 12 resides in diametric opposition to the second crank arm 16'. Since both the spindle 92 and both of the socket cavities 48' and 49' are of matching, polygonal cross section, proper alignment of the first crank arm 12 and the second crank arm 16' is easily accomplished.

After the first crank arm 12 has been secured to the second coupling end 98, the spindle 92 is inserted into the bottom bracket shell 58 within the cups 56 in the manner previously described. The second crank arm 16 is then secured to the first coupling end 96 of the spindle 92, in the manner described in the assembly of the bicycle crank assembly 80 depicted in FIGS. 4 and 5. Once the three main components of the bicycle sprocket crank assembly 90, namely the first and second crank arms 12 and 16' and the spindle 92 are fully assembled, the crank arms 12 and 16' are firmly, but releaseably locked in diametric opposition to each other and are tightly clamped relative to each other and relative to the spindle 92.

Due to the tapered connections between the crank arms 12 and 16', the crank arms 12 and 16' can be detached from the spindle 92 relatively easily, simply by unscrewing the lock bolt fasteners 22 and 23 and tapping the crank arms 12 an 16' free from the spindle 92. However, when the fasteners 22 and 23 are tightened, the joints formed at the opposing first and second coupling ends 96 and 98 of the spindle 92 are extremely tight and quite strong.

Undoubtedly, numerous variations and modifications of the invention will become readily apparent to those familiar with bicycle spindles. For example, fastening systems such as expansion bolts may be employed in place of the simple lock bolt fasteners 22 and 23 in the embodiments of the invention illustrated. Also, in the embodiments of the invention in which the sockets and coupling ends of the drive shaft are both of polygonal cross section, the hollow cavities and drive shaft ends can be formed with any number of contact faces desired, as long as the number of contact surfaces in the hollow cavities and drive shaft coupling ends match in size and orientation. Accordingly, the scope of the invention is not limited to the specific embodiments illustrated and described, but rather is defined in the claims appended hereto.

I claim:

1. A bicycle crank assembly, comprising:
   a first crank arm with an integrated hollow spindle, said integrated hollow spindle terminating with a substantially hexagonal untapered end;
   a second crank arm disposed diametrically opposite said first crank arm, said second crank arm fitted with an internally tapered coupling socket at one end, said internally tapered coupling socket including a plurality of inner contact surfaces arranged in a substantially hexagonal configuration, said contact surfaces defining a decreasing inner cross-section in a direction away from said substantially hexagonal untapered end of said first crank arm, said substantially hexagonal untapered end being radially aligned with said hexagonal inner contact surfaces; and
   a sleeve configured for operative coupling between said first and second crank arms, said sleeve being comprised of a cluster of wedge-shaped shims, said wedge-shaped shims being loosely connected via a plurality of straps to define a substantially C-shaped cross-section, said loosely connected wedge-shaped shim cluster having a substantially hexagonal configuration which is tapered to conform to the shape of the internally tapered coupling socket of said second crank arm, said tapered wedge-shaped shim cluster including an inner surface configured for frictional contact with said substantially hexagonal untapered end of said first crank arm and an outer surface configured for frictional contact with said hexagonal inner contact surfaces of said second crank arm, said frictional contact occurring during assembly of said first and second bicycle crank arms.

2. The bicycle crank assembly of claim 1, wherein the loose shim connection allows for relative radial movement between said wedge-shaped shims.

3. The bicycle crank assembly of claim 2, wherein said substantially C-shaped cluster cross-section is achieved by omitting at least one interconnecting strap.

4. The bicycle crank assembly of claim 3, further comprising a threaded fastener.

5. The bicycle crank assembly of claim 4, wherein said threaded fastener is operatively received within the hollow interior of said substantially hexagonal untapered end of said first first crank arm via said internally tapered coupling socket of said second crank arm and said tapered wedge-shaped shim cluster, respectively, during assembly of said first and second bicycle crank arms.

6. The bicycle crank assembly of claim 5, wherein said operatively received fastener tightly engages said second crank arm relative to said integrated spindle.

7. The bicycle crank assembly of claim 6, wherein said tight engagement immobilizes said first and second crank arms relative to each other.

8. The bicycle crank assembly of claim 5, wherein continued threaded advancement of said fastener causes said inner socket surfaces of said second crank arm to clamp said tapered wedge-shaped shim cluster tightly over said hexagonal untapered end of said first crank arm.

9. The bicycle crank assembly of claim 8, wherein said advancing threaded fastener includes a locking head configured to bear against an annular shoulder integrally formed on the interior of said coupling socket.

10. The bicycle crank assembly of claim 1, further comprising at least one annular spacer.

11. The bicycle crank assembly of claim 10, wherein said at least one annular spacer is configured for mounting onto said integrated spindle by way of said substantially hexagonal untapered end.

12. The bicycle crank assembly of claim 11, wherein said mounted spacer bears against one end of a bicycle frame portion which is rotationally mounted onto said integrated spindle proximate to said first crank arm.

* * * * *